US012687246B2

(12) United States Patent
Pye et al.

(10) Patent No.: US 12,687,246 B2
(45) Date of Patent: Jul. 21, 2026

(54) SEALING DEVICES AND RELATED METHODS FOR OIL AND GAS APPLICATIONS

(71) Applicant: Saudi Arabian Oil Company, Dhahran (SA)

(72) Inventors: Richard Mark Pye, Dhahran (SA); Hashim Awwami, Dhahran (SA); Abdulrahman Assiri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 105 days.

(21) Appl. No.: 18/582,032

(22) Filed: Feb. 20, 2024

(65) Prior Publication Data

US 2025/0264170 A1     Aug. 21, 2025

(51) Int. Cl.
| *E21B 33/10* | (2006.01) |
| *F16L 21/02* | (2006.01) |
| *F16L 21/08* | (2006.01) |
| *F16L 37/62* | (2006.01) |

(52) U.S. Cl.
CPC .............. *F16L 21/02* (2013.01); *F16L 21/08* (2013.01); *F16L 37/62* (2013.01)

(58) Field of Classification Search
CPC .......... E21B 33/13; E21B 33/14; E21B 23/01; E21B 23/06; F16L 21/02; F16L 21/08; F16L 37/62

USPC ...................................... 166/177.4, 237–240
See application file for complete search history.

(56)     References Cited

U.S. PATENT DOCUMENTS

| 2,464,713 | A | * | 3/1949 | Penick ................ E21B 33/1291 |
| | | | | 166/138 |
| 3,487,534 | A | * | 1/1970 | Schustack ............... F16L 27/12 |
| | | | | 29/237 |
| 4,842,082 | A | * | 6/1989 | Springer ................. E21B 23/06 |
| | | | | 175/286 |
| 6,276,690 | B1 | * | 8/2001 | Gazewood .......... F16L 55/1657 |
| | | | | 166/123 |
| 7,673,673 | B2 | * | 3/2010 | Surjaatmadja ........ E21B 43/114 |
| | | | | 166/177.5 |
| 11,346,488 | B1 | * | 5/2022 | Walls ................... F16L 55/1683 |
| 12,435,587 | B2 | * | 10/2025 | Andersen .............. E21B 43/105 |
| 12,497,854 | B2 | * | 12/2025 | Gutterres .............. E21B 33/127 |
| 2004/0226724 | A1 | | 11/2004 | Hirth et al. |
| 2018/0023367 | A1 | | 1/2018 | Stair et al. |
| 2018/0038192 | A1 | | 2/2018 | Stair et al. |

* cited by examiner

*Primary Examiner* — Kenneth L Thompson
(74) *Attorney, Agent, or Firm* — Fish & Richardson P.C.

(57)     ABSTRACT

A sealing device includes a first ring that is fixedly attached to a pipe segment, a second ring that is movably secured to the pipe segment and spaced axially apart from the first ring in an initial configuration of the sealing device, and a third ring that axially overlaps a first wall portion of the first ring and a second wall portion of the second ring, wherein the third ring is expandable radially to accommodate a third wall portion of the first ring and a fourth wall portion of the second ring within an interior region of the third ring.

20 Claims, 17 Drawing Sheets

SEALING DEVICES AND RELATED METHODS FOR OIL AND GAS APPLICATIONS

TECHNICAL FIELD

This disclosure relates to sealing devices for oil and gas applications, such as annular sealing devices with an expandable ring that provides metal-to-metal sealing with a surrounding pipe segment.

BACKGROUND

In oil and gas settings, casing strings may be cemented in place within a well to anchor the strings and provide barriers to uphole migration of fluids (e.g., gases and liquids) within the annular regions between the strings. If the cement job is of a low quality, then channels can form leak paths in the cement, which can result in annular fluid pressure building between the casing strings over time. For example, gas can therefore, undesirably, travel to the surface and cause the well to be suspended for safety reasons, as produced fluids are supposed to travel to the surface only through a production tubing (e.g., an innermost pipe segment).

Leak paths within the cement are difficult to fix (e.g., especially between casing strings located radially far from the production tubing) and require removal of the casing strings that are adjacent to the leak to provide access to the respective annuli. Such operations are expensive, complex, and technically difficult to perform. Packers may be employed within the annuli to block such leak paths. Conventional inflatable packers often require a fluid delivery port to be provided in the casing string, but such port is subject to failure over time. Conventional swelling packers are formed from elastomers, which have a finite life span and are therefore also subject to failure during the expected life of the well. Such failures compromise the integrity of the well and should be prevented when possible.

SUMMARY

This disclosure relates to sealing devices for oil and gas applications, such as annular sealing devices with an expandable ring that provides metal-to-metal sealing with a surrounding pipe segment. For example, such sealing devices are installed within an annular region between inner and outer pipe segments of a casing string and include a fixed ring, a movable ring, and an expandable ring. The expandable ring can expand radially outward to accommodate a width of the fixed and movable rings within an interior region of the expandable ring. In some embodiments, one or more of all of the rings are made entirely of metal.

The details of one or more embodiments are set forth in the accompanying drawings and description. Other features, aspects, and advantages of the embodiments will become apparent from the description, drawings, and claims.

DETAILED DESCRIPTION

Figure 1:
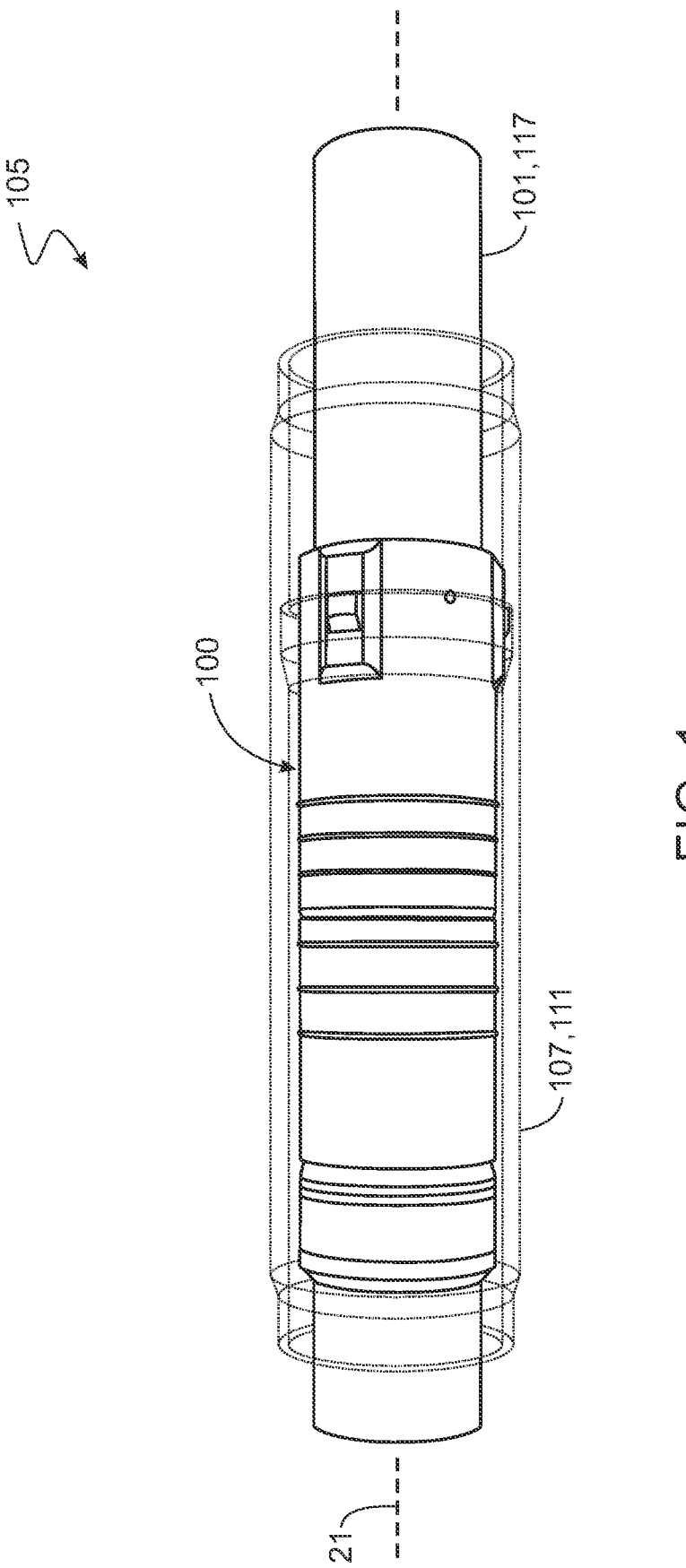
FIG. 1 is a side perspective view of an example casing string that is equipped with an example sealing device in an annular region.
Figure 2:
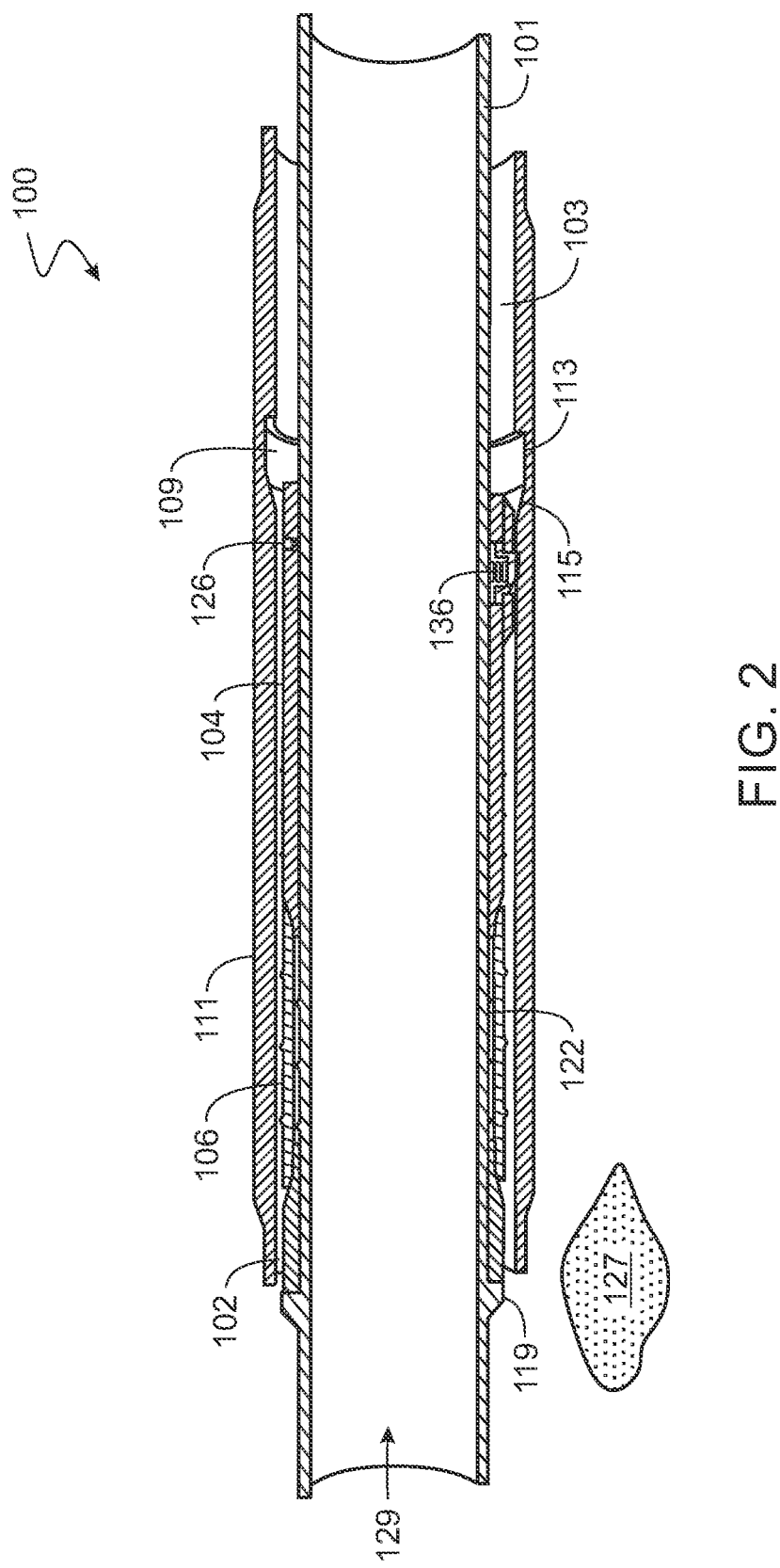
FIG. 2 is a side cross-sectional view of the casing string of FIG. 1, with the sealing device in a pre-set configuration.
Figure 3:
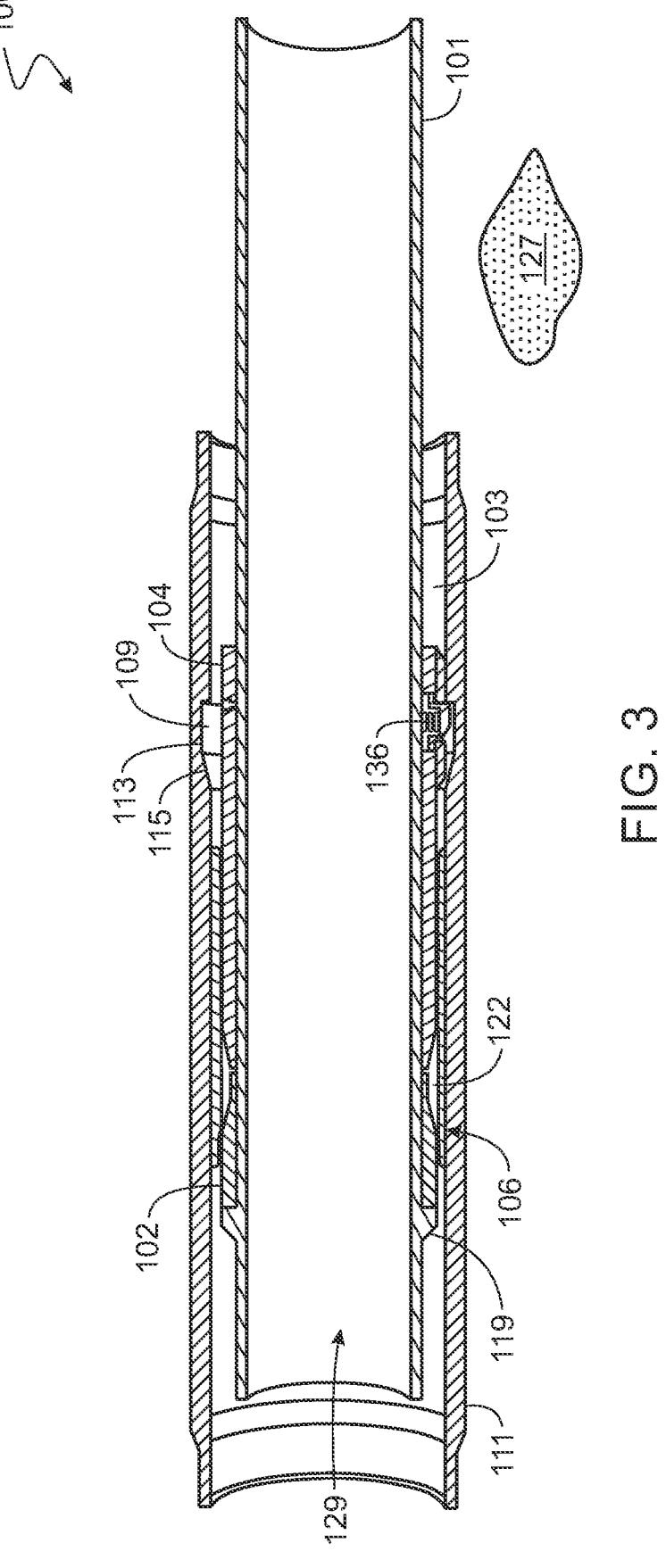
FIG. 3 is a side cross-sectional view of the casing string of FIG. 1, with the sealing device in a post-set configuration.
Figure 4:
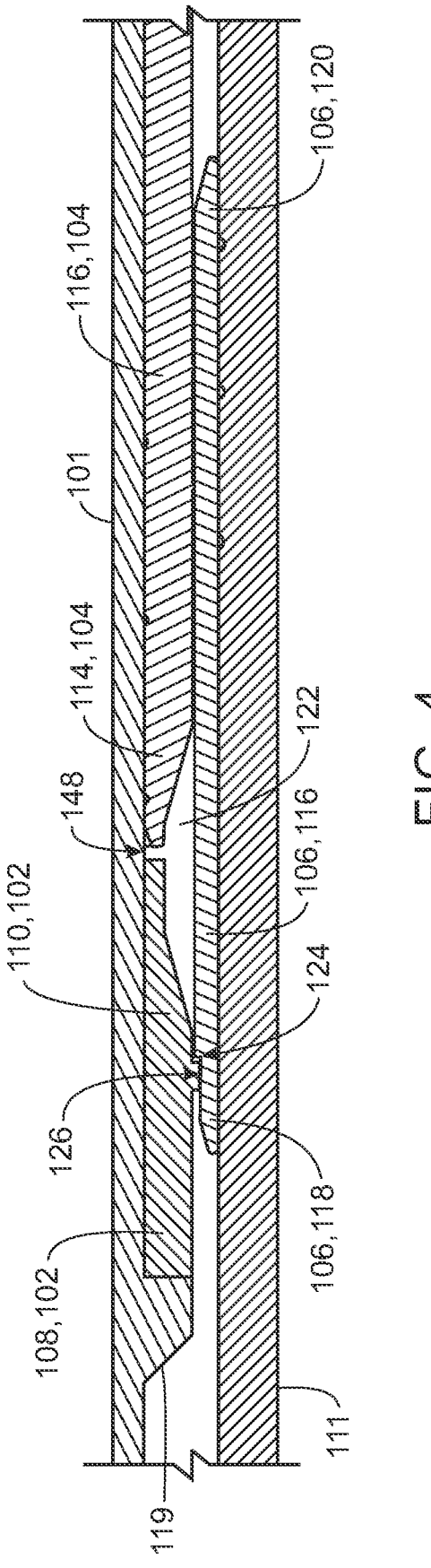
FIG. 4 is an enlarged, side cross-sectional view of a portion of the casing string of FIG. 1, with the sealing device in a post-set configuration.
Figure 5:
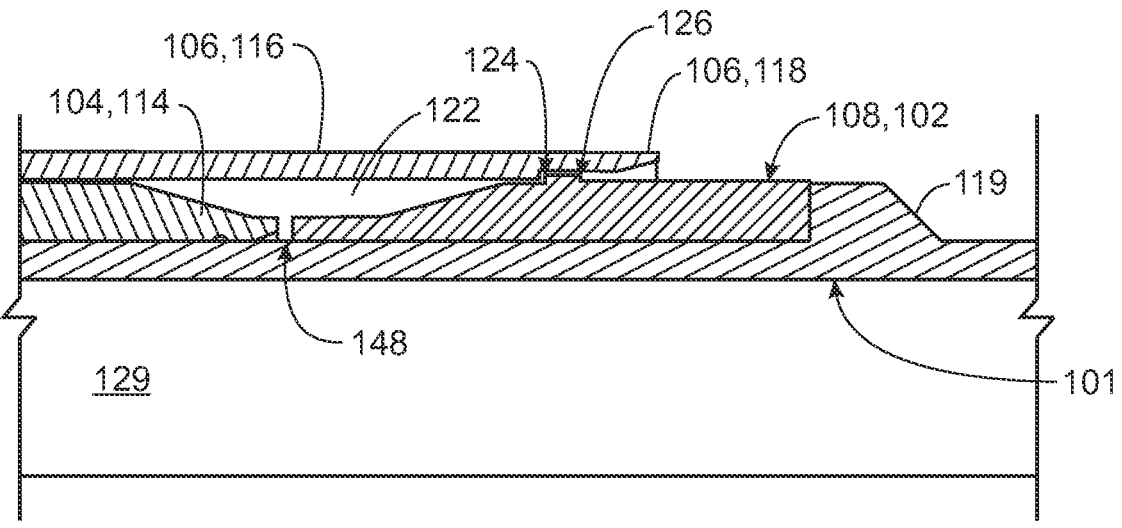
FIG. 5 is an enlarged, side cross-sectional view of a portion of the casing string of FIG. 1, with the sealing device in a post-set configuration.
Figure 6:
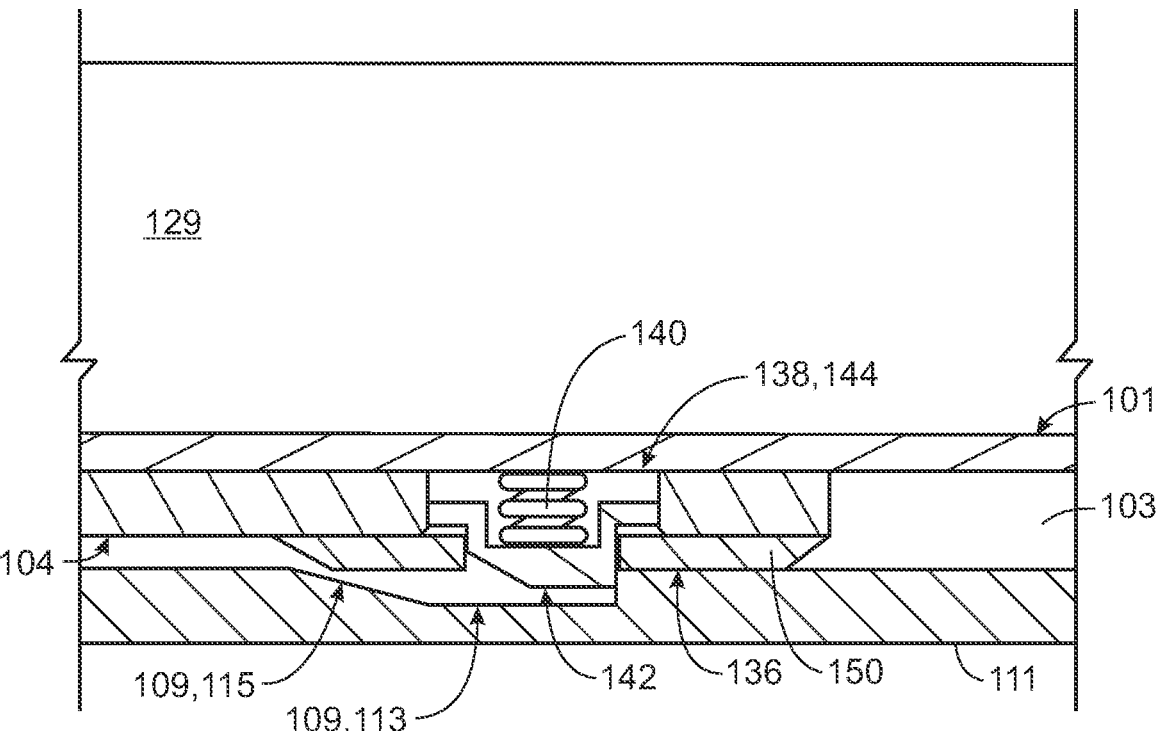
FIG. 6 is a side cross-sectional view of a latch mechanism of the sealing device of FIG. 1, with the sealing device in a post-set configuration
Figures 7, 8:
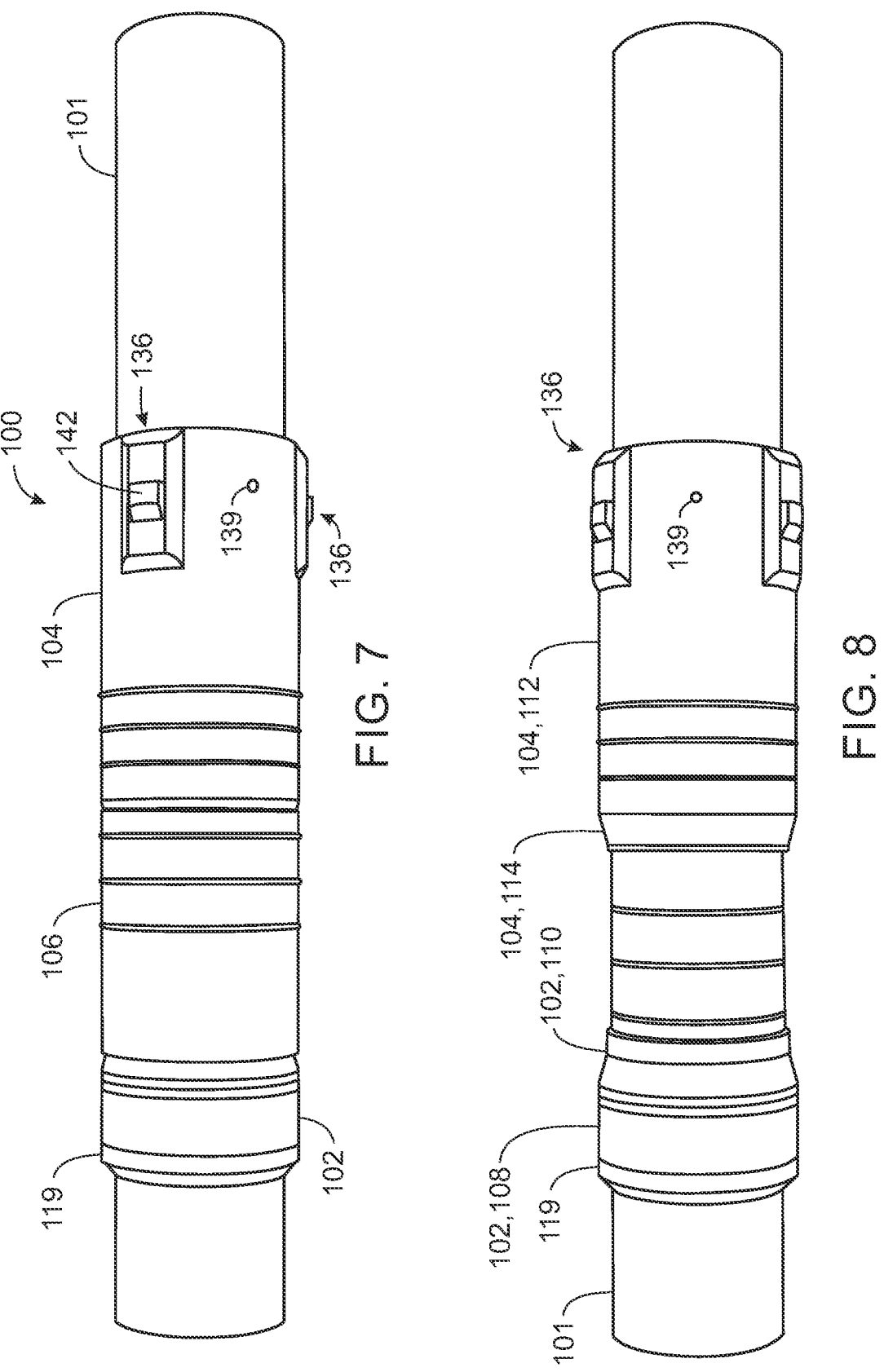
FIG. 7 is a side perspective view of an inner pipe segment of the casing string of FIG. 1, equipped with the sealing device in a pre-set configuration.
FIG. 8 illustrates a side perspective view of a fixed ring and a movable ring of the sealing device of FIG. 7 in a pre-set configuration of the sealing device.
Figures 9, 10:
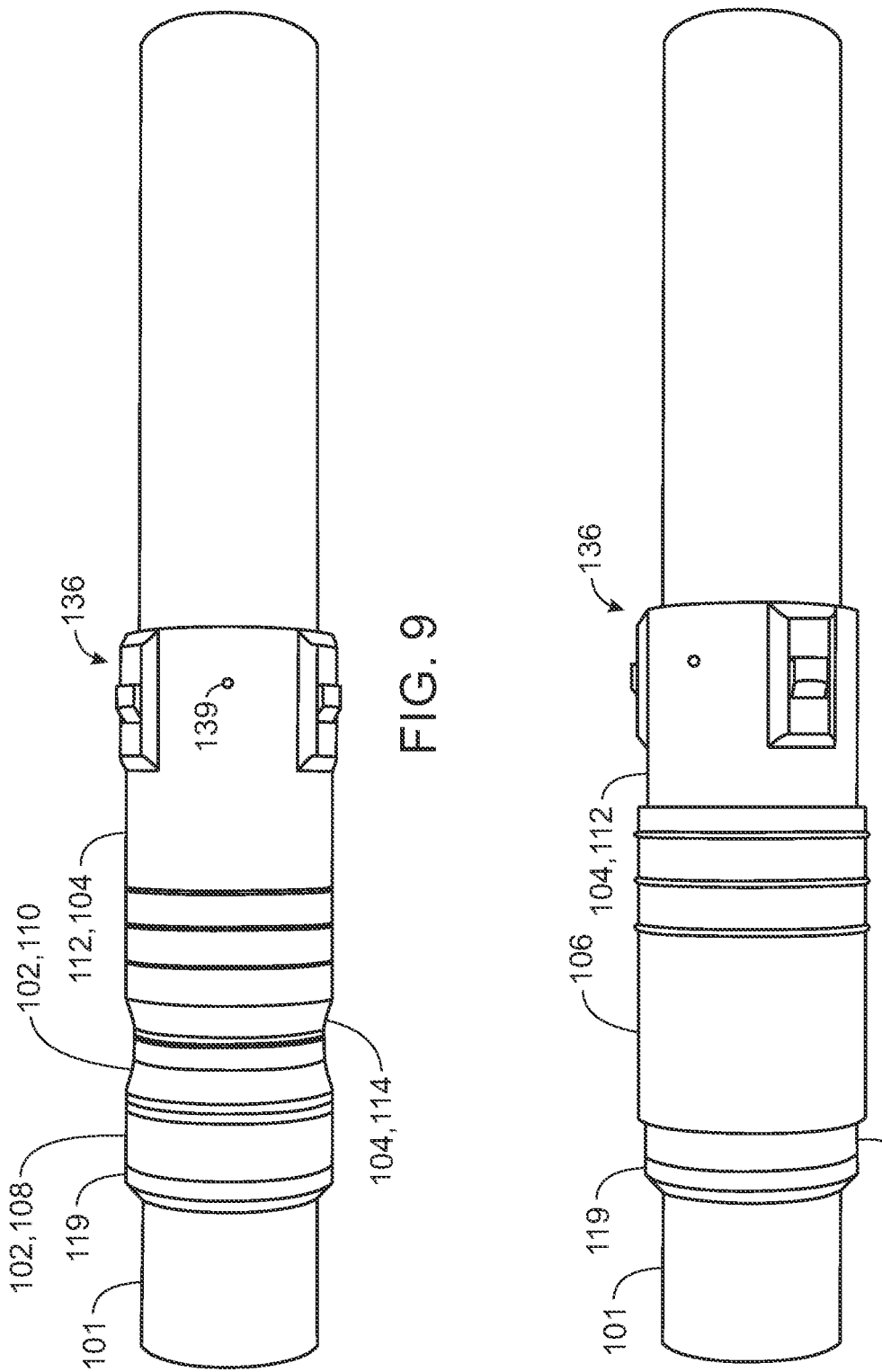
FIG. 9 illustrates a side perspective view of the fixed ring and the movable ring of the sealing device of FIG. 7 in the post-set configuration of the sealing device.
FIG. 10 illustrates a side perspective view the fixed ring, the movable ring, and an expandable ring of the sealing device of FIG. 7 in the post-set configuration of the sealing device.

FIGS. 1-3 illustrate an example casing string 105 that includes an inner pipe segment 101 (e.g., a first casing joint or a production tube) and an outer pipe segment 111 (e.g., a second casing joint) that surrounds the inner pipe segment 101 within a well of a rock formation. The inner pipe segment 101 defines an interior channel 129 through which fluids or other components may be flowed or dropped into the inner pipe segment 101. The casing string 105 is equipped with an example sealing device 100 that is located within an annular region 103 formed between the pipe segments 101, 111. In some embodiments, the sealing device 100 is a packer that is designed to seal radially against both pipe segments 101, 111 to close the annular region 103.

Referring to FIGS. 2 and 3, the outer pipe segment 111 includes a wall 107 that defines an interior grove 109 (e.g., a machined groove or recess). The groove 109 extends around an inner circumference of the pipe segment 111 and is formed to accommodate a portion of the sealing device 100. For example, the groove 109 is formed as a seat that includes a substantially cylindrical portion 113 and a tapered (e.g., substantially frustoconical) portion 115. The inner pipe segment 101 includes a wall 117 and an exterior stopping element 119 (e.g., a stop collar) that axially positions the sealing device 100 along the pipe segment 101. The inner pipe segment 101 defines a central axis 121. Both pipe segments 101, 111 are made of one or more metals, such as steel. The inner pipe segment 101 is illustrated in a pre-set position with respect to the outer pipe segment 111 in FIG. 2 and illustrated in a post-set position with respect to the outer pipe segment 111 in FIG. 3.

Referring to FIGS. 2-7, the sealing device 100 surrounds the inner pipe segment 101 and includes a fixed ring 102 (e.g., a static ring), a movable ring 104 (e.g., a dynamic ring), and an expandable ring 106. The fixed ring 102 is located in a fixed axial position with respect to the inner pipe segment 101. For example, the fixed ring 102 is positioned against the exterior stopping element 119. The fixed ring 102 includes a main wall portion 108 (e.g., a substantially cylindrical wall portion) and an end wall portion 110 (e.g., including both a tapered portion and a cylindrical portion). The movable ring 104 includes a main wall portion 112 (e.g., a substantially wall cylindrical portion) and an end wall portion 114 (e.g., including both a tapered portion and a cylindrical portion). In a pre-set (e.g., initial) configuration of the sealing device 100 (shown in FIG. 2), the movable ring 104 is secured to the inner pipe segment 101 at an initial axial position by one or more set screws 139 (e.g., grub screws). In an operational configuration of the sealing device 100, the movable ring 104 is movable axially with respect to the inner pipe segment 101 from the initial axial position to a final axial position that corresponds to a post-set configuration (e.g., a final or functional configuration) of the sealing device 100 (shown in FIG. 3).

The expandable ring 106 includes a main wall portion 116 (e.g., a substantially cylindrical wall portion), a first end wall portion 118 (e.g., including both a tapered portion and a cylindrical portion), and a second end wall portion 120 (e.g., including both a tapered portion and a cylindrical portion). In the pre-set configuration of the sealing device 100 (shown in FIGS. 2 and 7), the end wall portions 118, 120 respectively overlap the end wall portions 110, 114 such that the end wall portions 110, 114 determine an axial position of the expandable ring 106. Owing to the tapered portions of the end wall portions 110, 114, a circumferential gap 122 is disposed between the rings 104, 106, 108 in the pre-set configuration.

Referring to FIGS. 4-9, during a setting operation, the movable ring 104 is moved axially into the gap 122 along the inner pipe segment 101 until the wall portions 110, 114 either contact each other or are separated by a small, optional gap 148. For example, adequate sealing can be achieved even when the small gap 148 is present between the rings 102, 104, as illustrated. In embodiments for which no gap exists such that the movable ring 104 ultimately contacts the ring fixed ring 102, the maximum travel distance of the movable ring 104 will have been reached. In some embodiments, such contact between the rings 102, 104 in this manner maximizes the possible sealing area.

Referring to FIGS. 3-5, 10, and 12, as the movable ring 104 moves axially, the expandable ring 106 expands radially outward to accommodate a width of the main wall portions 108, 112 of the fixed and movable rings 102, 104 within a cylindrically-shaped interior region 146 of the expandable ring 106. While expanding, the expandable ring 106 slides axially over the end wall portions 110 of the fixed ring 102 to contact the main wall portion 108, and the movable ring 104 slides axially interiorly within the expandable ring 106 such that the expandable ring 106 contacts the main wall portion 112. The expandable ring 106 is permitted to slide along the fixed ring 102 until a shoulder 124 of the expandable ring 106 abuts a stopping element 126 (e.g., a protrusion) of the fixed ring 102. In this post-set configuration of the sealing device 100, the expandable ring 106 is positioned as illustrated in FIGS. 3-5 and 10.

In some embodiments, the fixed ring 102 and the movable ring 104 are formed from one or more metals, such as steel. In some embodiments, the expandable ring 106 is formed from one or more expandable metals that can withstand high differential pressures for VO gas qualification, such as specially treated steel. In some embodiments, one or more of all of the rings 102, 104, 106 are made entirely of metal. In some embodiments, the fixed ring 102 has a length in a range of about 0.1 meters (m) to about 0.3 m. In some embodiments, the movable ring 104 has a length in a range of about 0.5 m to about 5 m. In some embodiments, the expandable ring 106 has a length in a range of about 0.4 m to about 5.5 m. In some embodiments, the sealing device 100 has total a length in a range of about 1 m to about 12 m in the pre-set configuration of sealing device. In some embodiments, the sealing device 100 has total a length in a range of about 0.4 m to about 7 m in the post-set configuration of sealing device. In some embodiments, the movable ring 104 has moved a total distance of about 0.3 m to about 5 m with respect to the inner pipe segment 101 between the pre-set and post-set configurations of the sealing device 100 (e.g., during a complete operation of the sealing device 100).

Figures 11, 12:
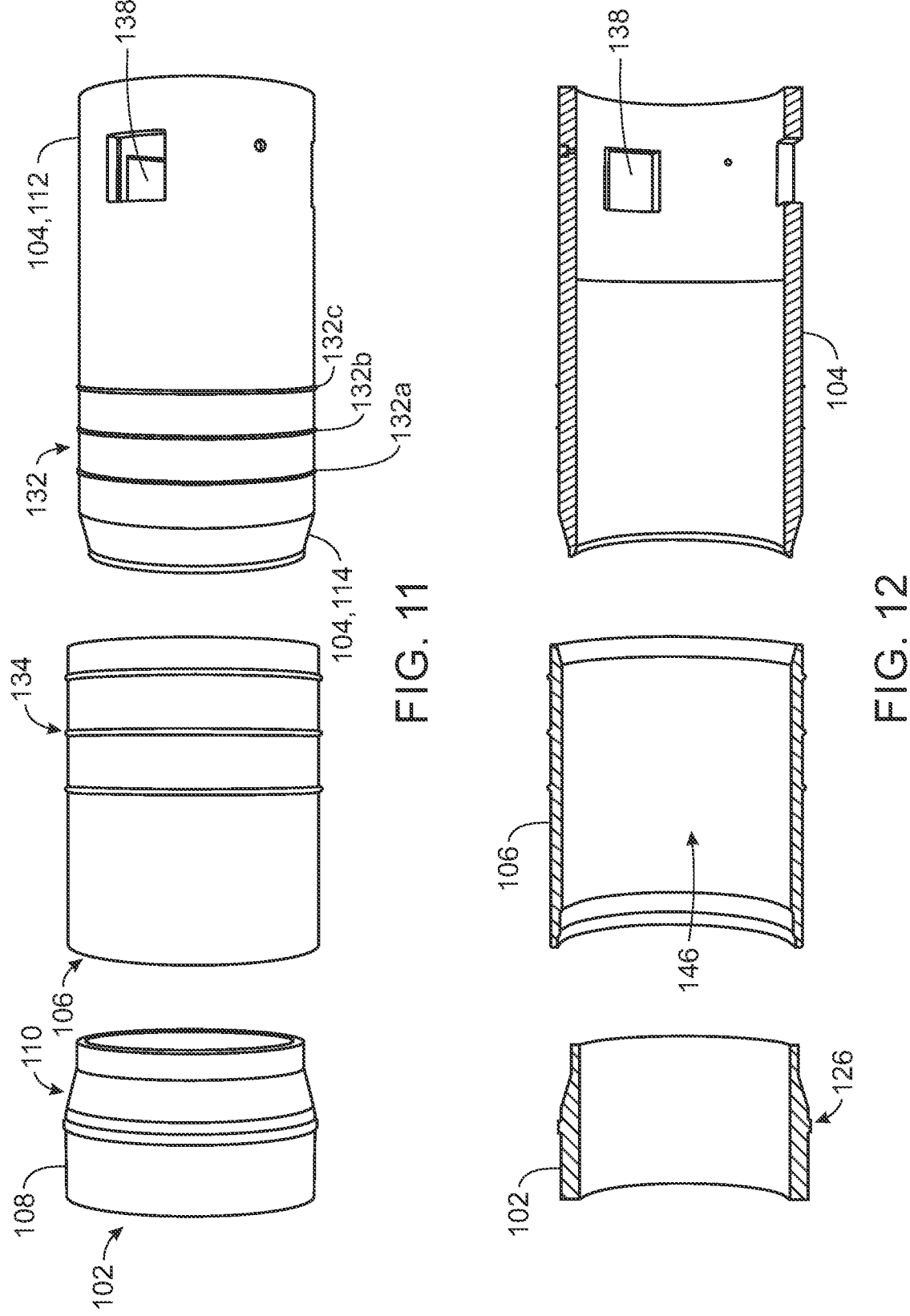
FIG. 11 illustrates an exploded side perspective view of the fixed ring, the movable ring, and the expandable ring of the sealing device of FIG. 7.
FIG. 12 illustrates a side cross-sectional view of the fixed, movable, and expandable rings of FIG. 11.
Figure 13:
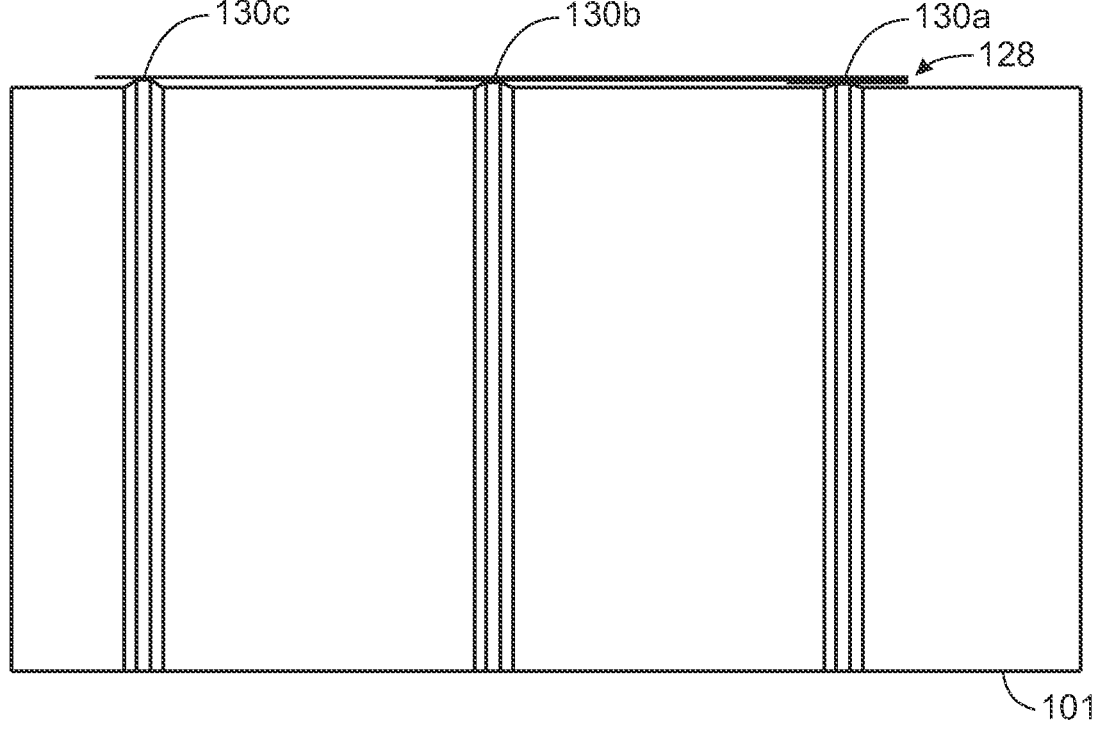
FIG. 13 illustrates a side perspective view of circumferential sealing elements along an inner pipe segment of the casing string of FIG. 1.

Referring to FIGS. 11-13, the inner pipe segment 101, the movable ring 104, and the expandable ring 106 include multiple circumferential sealing elements (e.g., sealing rings or sealing ribs) that are machined into their exterior wall surfaces. Some of the sealing elements are also visible in FIG. 4. The sealing elements are formed to radially engage (e.g., bite radially into) material of the adjacent components to enhance a sealing effect between these concentrically arranged components. The sealing elements of the device components that experience or undergo significant relative sliding (e.g., the inner pipe segment 101 and the dynamic ring) have progressively increasing heights (e.g., standoffs), as indicated by the lines 128 in FIG. 13. For example, on each of the inner pipe segment 101 and the movable ring 104, the sealing element with the smallest height is the first to engage the surrounding sliding component, such that each successive sealing element causes increasing radial expansion of the surrounding component.

The inner pipe segment 101 includes sealing elements 130a, 130b, 130c of respective heights that progressively increase in a first direction, and the movable ring 104 includes sealing elements 132a, 132b, 132c of respective heights that increase in an opposite, second direction. The expandable ring 106 includes sealing elements 134 of the same height since no component of the sealing device 100 surrounds the external surface of the expandable ring 106. While each of the inner pipe segment 101, the movable ring 104, and the expandable ring 106 are illustrated as including three sealing elements, in general, any of these components may include less than three or more than three such sealing elements.

In some embodiments, the sealing elements 130a, 130b, 130c have heights in a range of about 0.2 centimeters (cm) to about 0.5 cm. In some embodiments, the sealing elements 132a, 132b, 132c have heights in a range of about 0.2 cm to about 0.5 cm. In some embodiments, the sealing elements 134 have heights in a range of about 0.2 cm to about 0.5 cm. In some embodiments, the sealing elements along any of the inner pipe segment 101, the movable ring 104, and the expandable ring 106 may be spaced axially (e.g., equidistantly or non-equidistantly) apart by a distance of about 0.02 m to about 0.2 m.

Referring to FIGS. 6, 7, 11, and 12, the movable ring 104 also includes one or more latch mechanisms 136 that fixes a position of the movable ring 104 with respect to the outer pipe segment 111 during a setting operation. The latch mechanisms 136 also serve as centralizers that radially center the sealing device 100 (e.g., and accordingly, the inner pipe 101 to which the sealing device 100 is installed) within the outer pipe segment 111. The latch mechanisms 136 are aligned with an end 138 of the main wall portion 112 and, in part, extend through respective openings 138 in the main wall portion 112. Each latch mechanism 136 includes a radially oriented spring 140 and a latch 142 (e.g., a latching dog) positioned adjacent and radially outward of the spring 140. The spring 140 and the latch 142 are positioned in a receptacle 144 defined by the inner pipe segment 101 and an opening 138 in the main wall portion 112. The latch mechanism 136 also includes a housing 150 that is secured to an exterior surface of the main wall portion 112 to secure the latch 142 to the movable ring 304 within the receptacle 144.

With the latch 142 spring-loaded (e.g., biased) in a radially outward direction, the latch 142 pushes outwardly against an inner surface of the outer pipe segment 111 while the inner pipe segment 102 is moved axially within the outer pipe 111. When the latch 142 reaches the groove 109 (e.g., such that the latch 142 is radially unobstructed), a portion of the latch 142 extends radially outward through an opening in the housing 150 and into the groove 109 to prevent the movable ring 142 from moving axially.

Figures 14, 15:
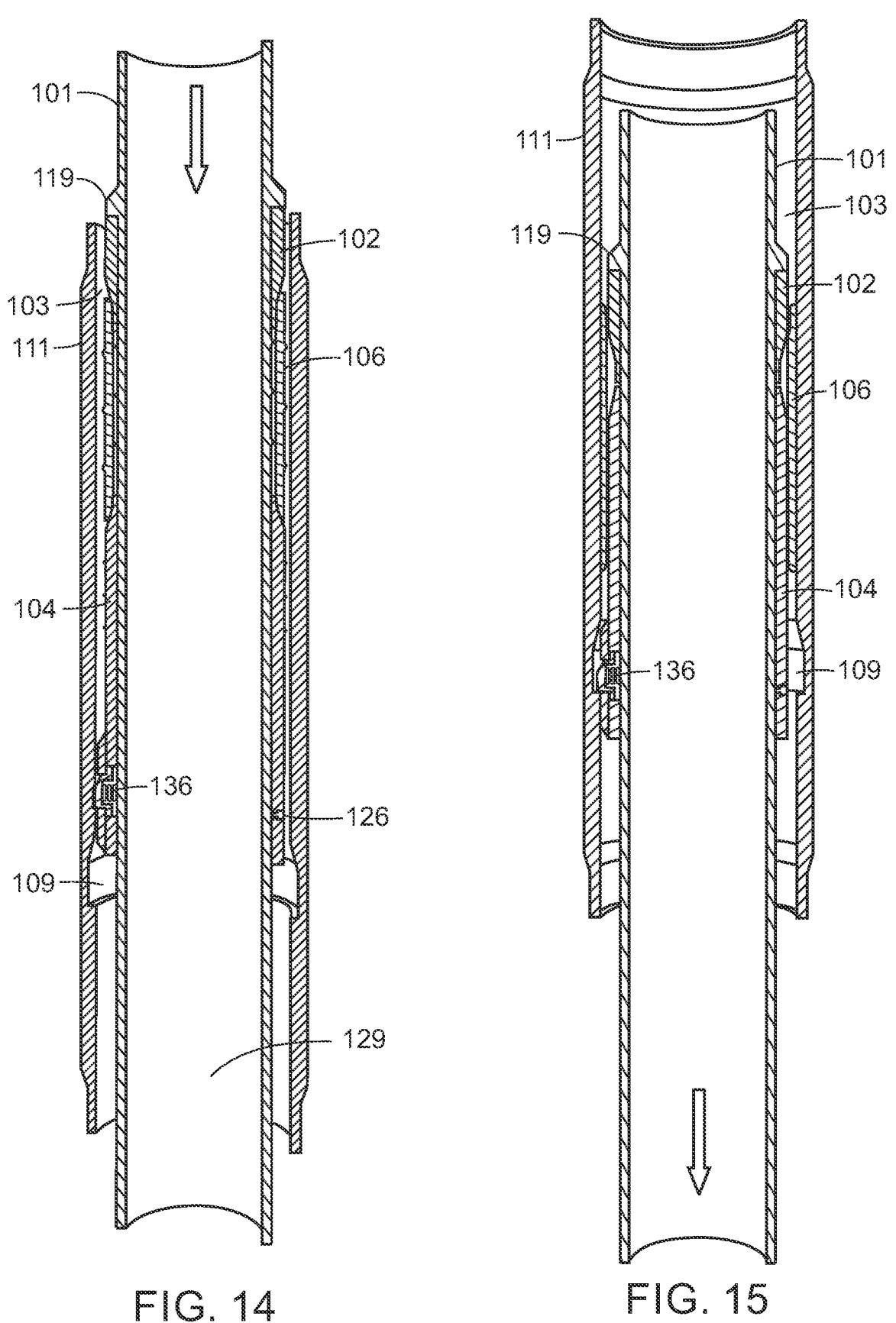
FIG. 14 illustrates a side cross-sectional view of the sealing device, within the casing string of FIG. 1, in a pre-set configuration of the sealing device during a weight-set operation.
FIG. 15 illustrates a side cross-sectional view of the sealing device, within the casing string of FIG. 1, in a post-set configuration of the sealing device during a weight-set operation.

FIGS. 14 and 15 respectively illustrate pre-set and post-set configurations of the sealing device 100 during a weight-set operation for installing (e.g., cementing) the casing string 105 in a well of a rock formation 127. The groove 109 of the outer pipe segment 111 is at a known depth based on the prior installation of the outer pipe segment 111. The sealing device 100 is then securely installed to the inner pipe segment 101 (e.g., at an axial position that will enable the latch mechanisms 136 of the sealing device 100 to engage the groove 109 of the outer pipe segment 111 before a downhole end (e.g., a shoe) of the inner pipe segment 101 reaches the bottomhole end of the well. For example, since the latch mechanisms 136 will engage the groove 109 as the inner pipe segment 101 is run into the well, it is important to appropriately, axially position the the inner pipe segment 101 to prevent the shoe from contacting the bottomhole before the sealing device 100 reaches the seat, while also leaving enough space to allow the sealing device 100 to complete its stroke length.

The inner pipe segment 101, equipped with the sealing device 100, is advanced into the well and through the outer pipe segment 111 to an axial position at which the latch mechanism 136 is located above and spaced apart from the groove 109. In cases for which a primary cement job is planned, the cement exits the casing string 105 from the bottom (e.g., the shoe) and travels in an uphole direction 123 within the annular region 103. For example, the sealing device 100 can be axially positioned anywhere in the casing string 105 above the shoe, and the cement will travel past the sealing device 100 such that sealing is effected before the cement sets. In cases for which a secondary cement job is planned, an inflatable packer may be set and ports opened in the casing to allow cement to flow out of the annular region 103 above the location of the packer. The sealing device 100 will then be run below the 2-stage cement tool (e.g., a DV tool). In such cases, the primary cement may not reach the sealing device 100 either by design or due to circumstance, but the sealing device 100 can still be set in the same manner. The inner pipe segment 101, equipped with the sealing device 100, is then advanced further in the downhole direction 125 until the latch 142 engages (e.g., is received within) the groove 109 to prevent any further advancement of the inner pipe segment 101 within the outer pipe segment 102.

With the latch 142 securely retained within the groove 109, an uphole hold or grip on the inner pipe segment 101 can be released to allow the sealing device 100 to set between the inner and outer pipe segments 101, 111. For example, upon such release, the weight of the inner pipe segment 101, carrying the fixed ring 102 in fixed relation, will overcome the resistance of the set screw 139s (e.g., thereby breaking the set screws 139) to move with respect to the movable ring 104 in the downhole direction 125. Such movement thereby moves the fixed ring 102 axially towards the movable ring 104 and accordingly forces the expandable ring 106 radially outward to surround the main wall portions 108, 112 of the rings 102, 104. In this post-set configuration of the sealing device 100, the expandable ring 106 forms an outer metal-to-metal seal with the outer pipe segment 111 and forms an inner metal-to-metal with the fixed and movable rings 102, 104. Furthermore, the movable ring 104 forms a metal-to-metal seal with the inner pipe segment 101.

Figures 16, 17:
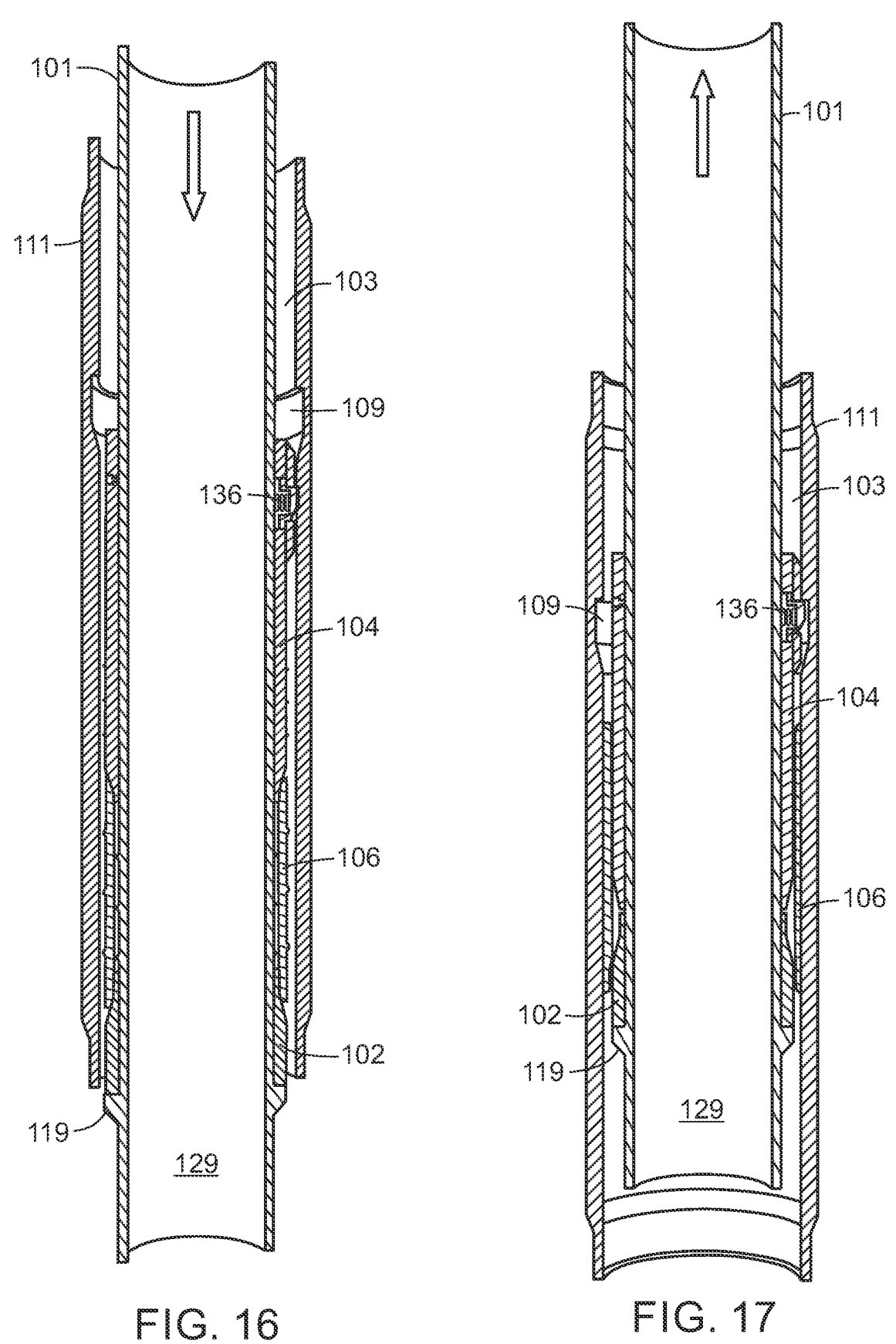
FIG. 16 illustrates a side cross-sectional view of the sealing device, within the casing string of FIG. 1, in a pre-set configuration of the sealing device during a tension-set operation.
FIG. 17 illustrates a side cross-sectional view of the sealing device, within the casing string of FIG. 1, in a post-set configuration of the sealing device during a tension-set operation.

In some implementations, the weight-set operation may be performed when the groove 109 of the outer pipe segment 111 is oriented as illustrated in FIGS. 14 and 15 (e.g., with the cylindrical portion 113 located downhole of the tapered portion 111). In other implementations, the groove 109 may be positioned in a reverse orientation, with the cylindrical portion 113 located uphole of the tapered portion 111, as illustrated in FIGS. 16 and 17. In such cases, the sealing device 100 may be set according to a tension-set operation.

FIGS. 16 and 17 respectively illustrate pre-set and post-set configurations of the sealing device 100 during such a tension-set operation for installing (e.g., cementing) the casing string 105 in a well of the rock formation 127. The outer pipe segment 111 is advanced (e.g., run) into the well along the downhole direction 125 until the groove 109 reaches a desired depth. The sealing device 100 is then securely installed to the inner pipe segment 101 (e.g., at an axial position that will enable the latch mechanism 136 of the sealing device 100 to pass the groove 109 of the outer pipe segment 111 before the downhole end of the inner pipe segment 101 reaches the bottomhole end of the well so that the sealing device 100 can set in the reverse direction (e.g., the uphole 123 direction).

The inner pipe segment 101, equipped with the sealing device 100, is advanced into the well and through the outer pipe segment 111 to an axial position at which the latch mechanism 136 is located below and spaced apart from the groove 109. Cement may travel within the casing string 105 as already described above with respect to a weight-set operation for a primary or secondary cement job. During the presently described operation (e.g., a tension-set operation), cement may or may not end up above the latch mechanism 136 upon setting, depending on a design of the cement job and various operational factors. The inner pipe segment 101, equipped with the sealing device 100, is then moved in the uphole direction 123 (e.g., raised) until the latch 142 engages (e.g., is received within) the groove 109 to prevent any further movement of the inner pipe segment 101 within the outer pipe segment 102.

With the latch 142 securely retained within the groove 109, the inner pipe segment 101 can be pulled further to allow the sealing device 100 to set between the inner and outer pipe segments 101, 111. For example, such pulling can cause the weight of the inner pipe segment 101, carrying the fixed ring 102 in fixed relation, to overcome the resistance of the set screws 139 (e.g., thereby breaking the set screws 139) to allow the ring 102 to move in the uphole direction 123 with respect to the movable ring 104. Such movement thereby moves the fixed ring 102 axially towards the movable ring 104 and accordingly forces the expandable ring 106 radially outward to surround the main wall portions 108, 112 of the rings 102, 104. In this post-set configuration of the sealing device 100, the expandable ring 106 forms an outer metal-to-metal seal with the outer pipe segment 111 and forms an inner metal-to-metal with the fixed and movable rings 102, 104. Furthermore, the movable ring 104 forms a metal-to-metal seal with the inner pipe segment 101.

Figure 18:
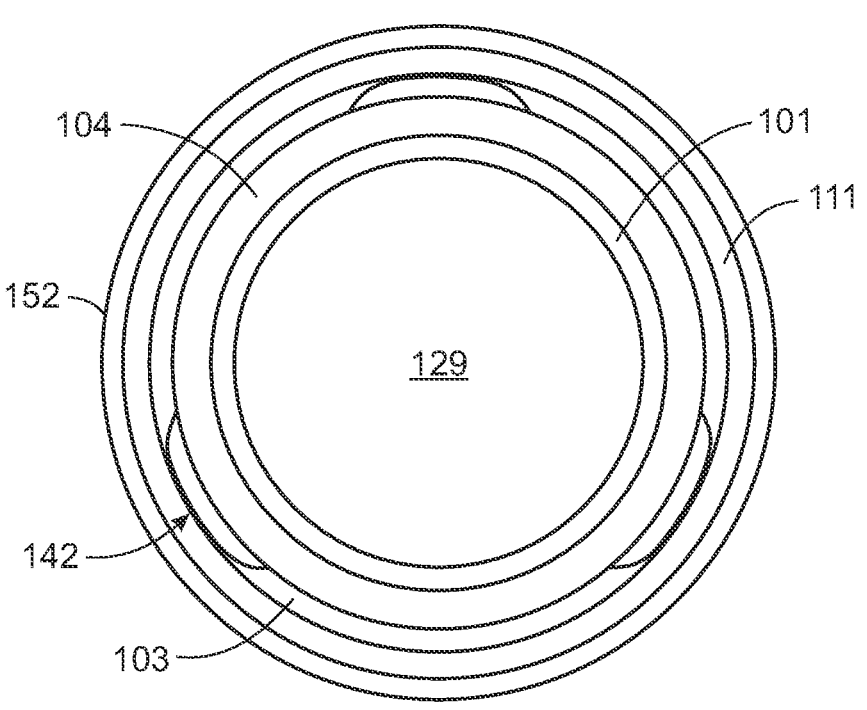
FIG. 18 illustrates a top cross-sectional view of the sealing device, within the casing string of FIG. 1, in a pre-set configuration of the sealing device.
Figure 19:
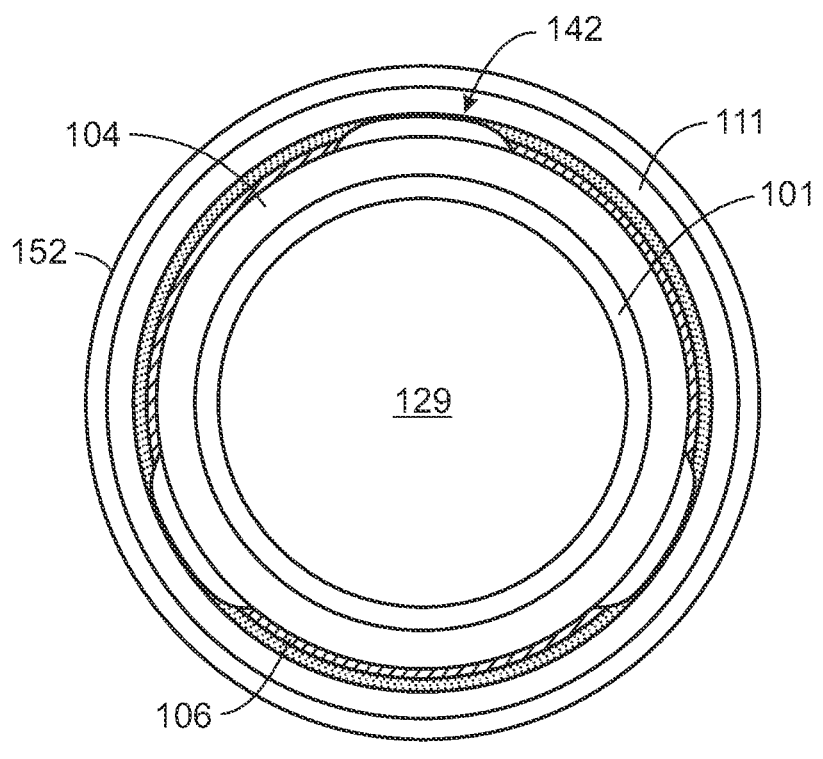
FIG. 19 illustrates a top cross-sectional view of the sealing device, within the casing string of FIG. 1, in a post-set configuration of the sealing device.

FIGS. 18 and 19 respectively illustrate the annular region 103 for both pre-set and post-set configurations of the sealing device 100 (e.g., irrespective of the type of setting operation that has been employed). In the pre-set configuration, the annular region 103 is open for cement or fluids to pass. In contrast, in the post-set configuration, the annular region 103 has been sealed (e.g., blocked or closed off) by the sealing device 100. (In the example of FIGS. 18 and 19, the outer pipe segment 111 is illustrated interiorly of another annular region 152 located between the outer pipe segment 111 and yet another, surrounding pipe segment (e.g., another casing string joint, not shown). A total number of pipe segments of the casing string 105 may depend on several operational parameters.)

The sealing device 100 advantageously prevents gas migration to the surface through the annular region 103 in a manner that is relatively easy to effect. For example, given that the sealing device 100 does not require the presence of any fluid ports or elastomeric materials within the well, the sealing device 100 reduces the likelihood of leak generation and/or movement within the annular region 103 and is designed to remain effective throughout an expected life of the well in which it is deployed. This is made possible, at least in part, by the all-metal construction of the sealing device 100.

Figure 20:
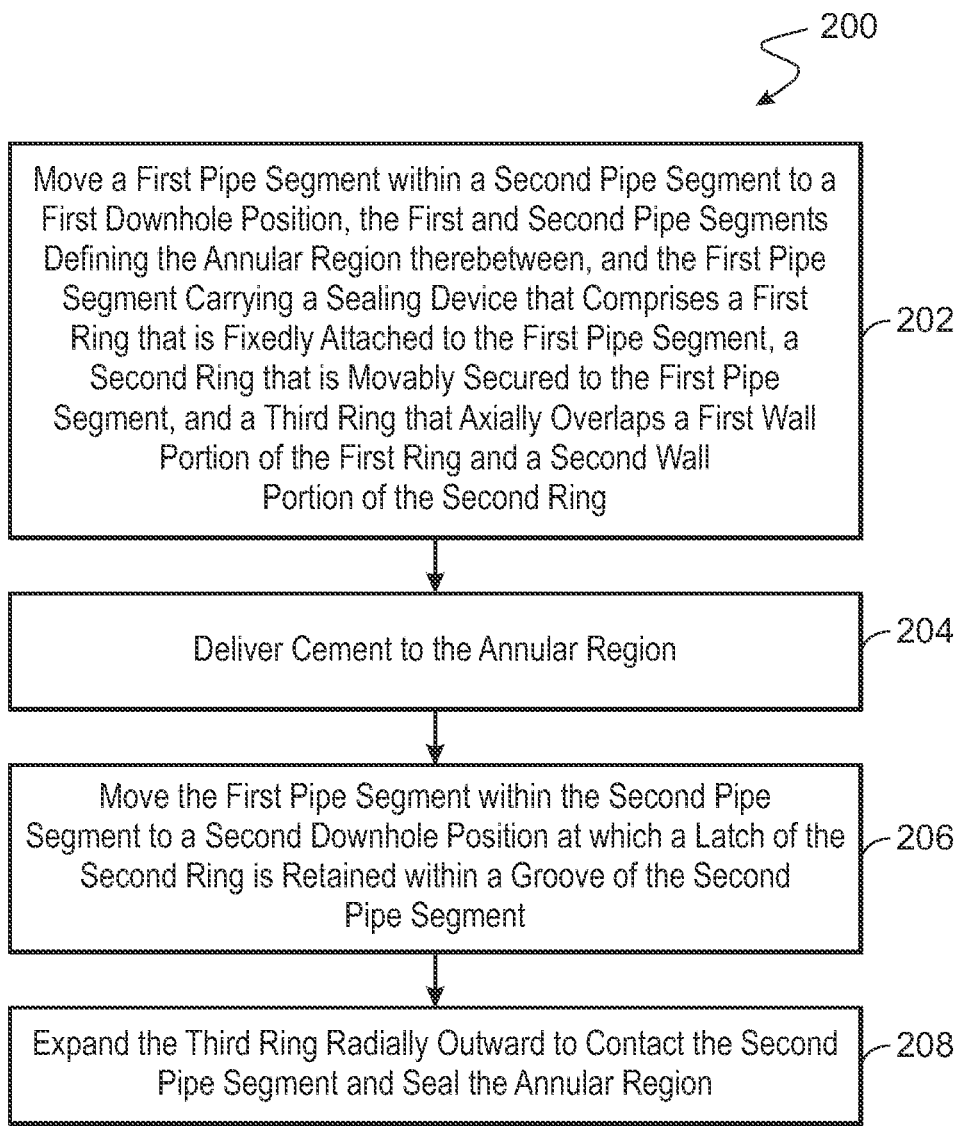
FIG. 20 is a flow chart illustrating an example method of sealing an annular region using the example sealing device of FIG. 1 or the example sealing device of FIG. 21.

FIG. 20 is a flow chart illustrating an example method 200 of sealing an annular region (e.g., the annular region 103). In some embodiments, the method 200 includes a step 202 for moving a first pipe segment (e.g., the inner pipe segment 101) within a second pipe segment (e.g., the outer pipe segment 101) to a first downhole position, the first and second pipe segments defining the annular region therebetween, and the first pipe segment carrying a sealing device (e.g., the sealing device 100, 300) that includes a first ring (e.g., the fixed ring 102) that is fixedly attached to the first pipe segment, a second ring (e.g., the movable ring 104, 304) that is movably secured to the first pipe segment, and a third ring (e.g., the expandable ring 106) that axially overlaps a first wall portion (e.g., the end wall portion 110) of the first ring and a second wall portion (e.g., the end wall portion 114) of the second ring. In some embodiments, the method 200 includes a step 204 for delivering cement to the annular region. In some embodiments, the method 200 includes a step 206 for moving the first pipe segment within the second pipe segment to a second downhole position at which a latch (e.g., the latch 142, 314) of the second ring is retained within a groove (e.g., the groove 109) of the second pipe segment. In some embodiments, the method 200 includes a step 208 for expanding the third ring radially outward to contact the second pipe segment and seal the annular region.

While the sealing device 100 has been described and illustrated with respect to certain dimensions, sizes, shapes, arrangements, materials, and methods 200, in some embodiments, a sealing device that is otherwise similar in construction and/or function to the sealing device 100 may include one or more different dimensions, sizes, shapes, arrangements, configurations, or materials, or be operated according to different methods.

Figure 21:
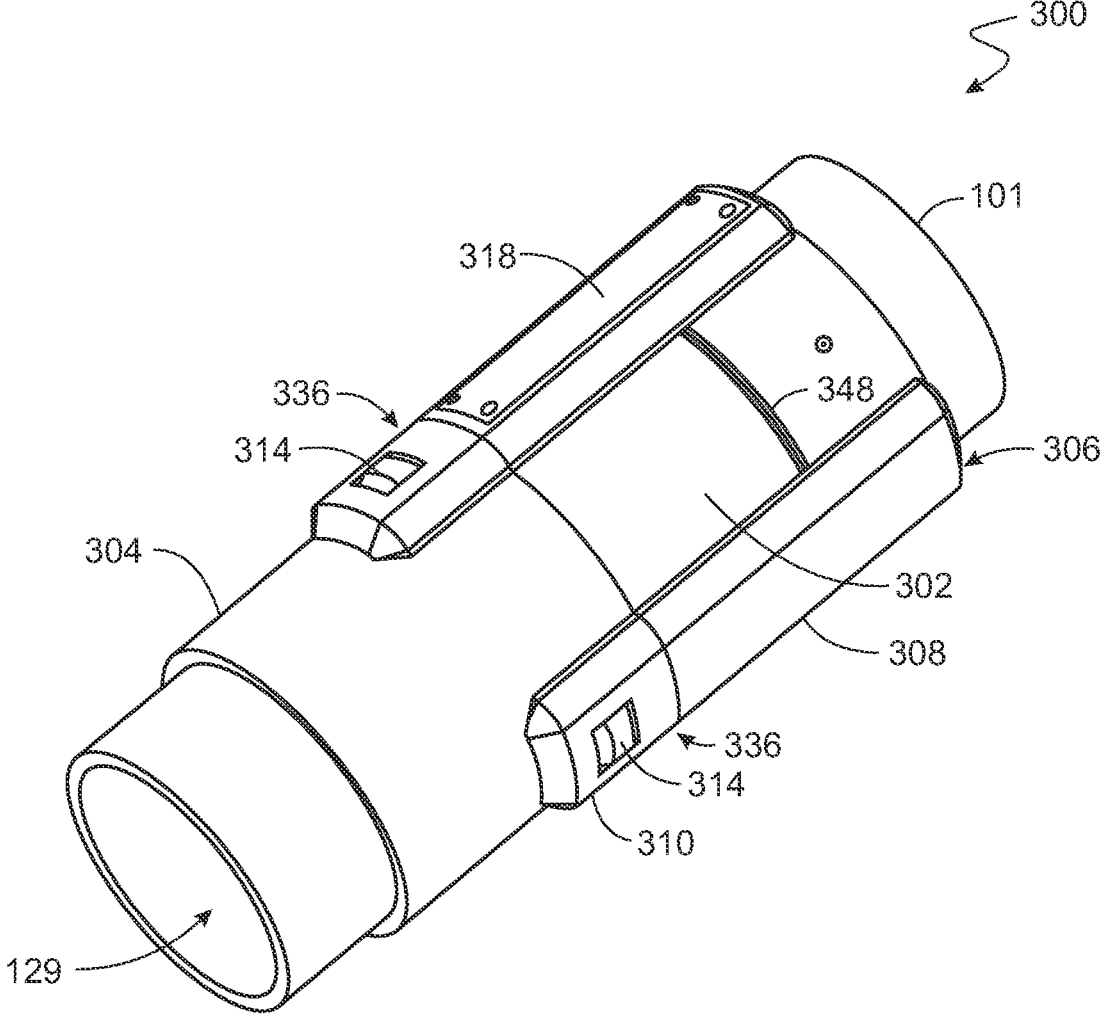
FIG. 21 is a perspective view of an inner pipe segment of the casing string of FIG. 1, equipped with an example sealing device that includes an automated locking mechanism.

For example, in some embodiments, a sealing device that is otherwise substantially similar to the sealing device 100 may include one or more smart latch mechanisms (e.g., automated locks) that can be automatically controlled to engage with or disengage with the groove 109 of the outer pipe segment 111 during a setting operation. Referring to FIGS. 19-21, a sealing device 300 includes multiple hydraulic latch mechanisms 336 instead of the mechanical latch mechanisms 136 of the sealing device 100. The sealing device 300 further includes a support ring 302 to which the latch mechanisms 336 are secured. The latch mechanisms 336 and the support ring 302 together provide a locking assembly 306. In addition to providing a locking functionality to the sealing device 300, the latch mechanisms 336 also serve as centralizers that radially center the sealing device 300 and the inner pipe 101 (e.g., to which the sealing device 300 is installed) within the outer pipe segment 111.

The sealing device 300 also includes a movable ring 304 that interfaces with the latch mechanism 336, but that is otherwise substantially similar in construction and function to the movable ring 104. Furthermore, the sealing device 300 is otherwise substantially similar in construction and function to the sealing device 100 and accordingly includes the fixed ring 102, the expandable ring 106, and other components and features described above with respect to the sealing device 100.

Figure 22:
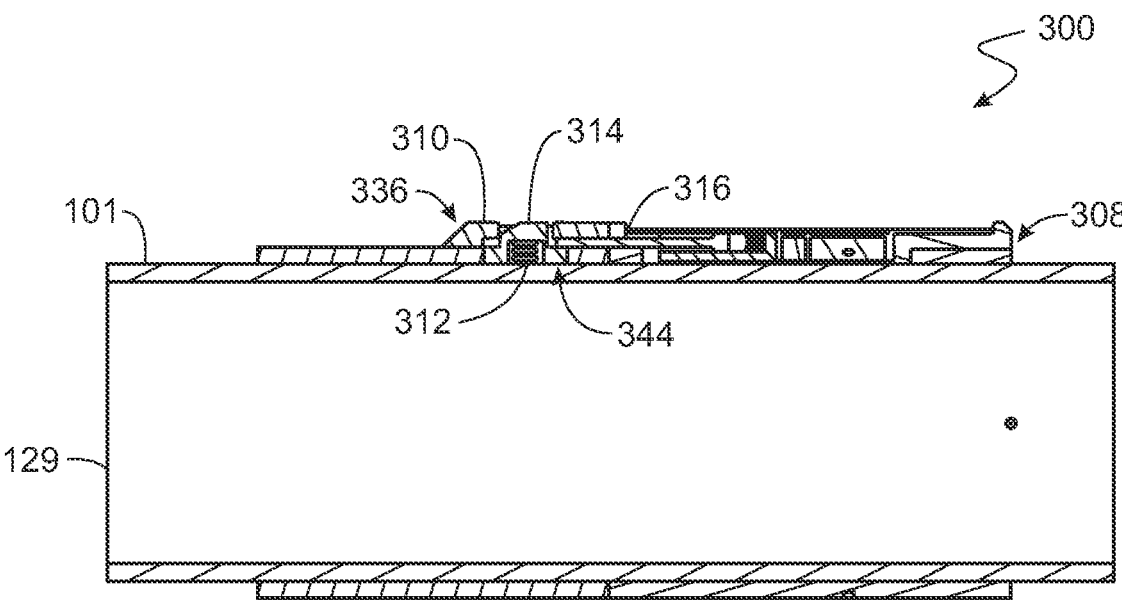
FIG. 22 is a cross-sectional view of the inner pipe segment and the sealing device of FIG. 21.
Figure 23:
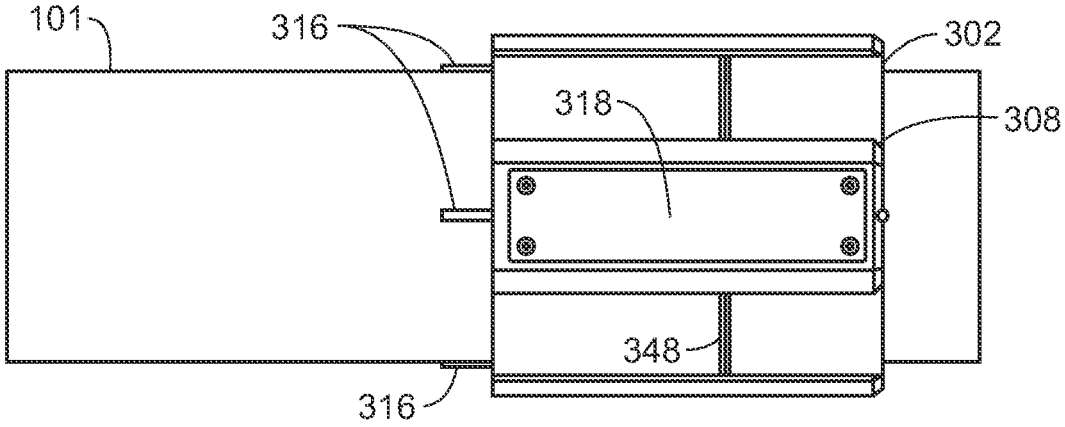
FIG. 23 is a side view of the inner pipe segment and the sealing device of FIG. 21, with certain components removed to expose latching pins of the sealing device.
Figure 24:
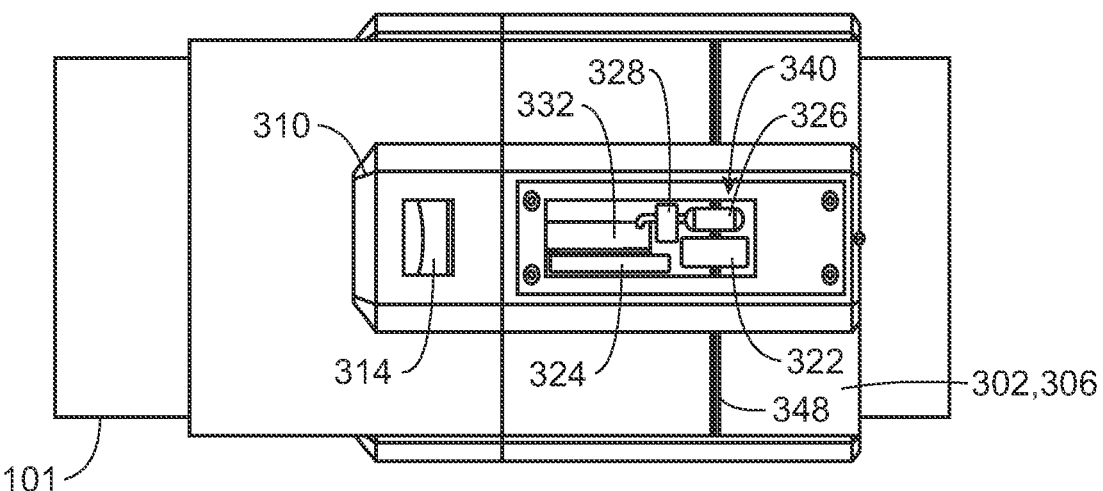
FIG. 24 is a side perspective view of the inner pipe segment and the sealing device of FIG. 21, with a cover removed to expose an actuation module of the sealing device.

Still referring to FIGS. 21-23, each latch mechanism 336 includes a main housing 308 that is positioned on the support ring 302 and a latch housing 310 that is positioned on the movable ring 304. The latch mechanism 336 further includes a radially oriented spring 312 and a latch 314 positioned adjacent and radially outward of the spring 312. The spring 312 and the latch 314 are positioned in a receptacle 344 formed by the inner pipe segment 101 and an opening in a main wall portion of the movable ring 304. The latch housing 310 is secured to the exterior surface of the main wall portion to secure the latch 314 to the movable ring 304 within the receptacle 344.

The latching mechanism 336 includes a latch pin 316 that is movable axially in a first direction over an end portion of the latch 314 to maintain the latch 314 directly against the inner pipe segment 101 (e.g., in a retracted radial position). The latch pin 316 is also movable axially in a second, opposite direction off of the latch 314 to allow the spring-loaded latch 314 to extend radially outward (e.g., to an extended position) from the latch housing 310 to engage the groove 109 of the outer pipe segment 111.

Referring to FIGS. 24-27, the latch mechanism 336 includes an actuation module 340 that is disposed within the main housing 308 and protected by a cover 318. The actuation 340 module includes electronics 322, an on-board battery 324 that powers the actuation module 340, a fluid tank 326, a valve 328, a valve actuator 330, a piston housing 332, hydraulic fluid 334, a fluid line 346, a fluid tank 326, a piston 338 positioned within the piston housing 332, and the latch pin 316, which extends from the piston 338. The piston 338 is equipped with seals 342 that prevent leakage of the fluid 334 circumferentially along the piston 338. In some embodiments, the electronics 322 includes one or more built-in sensors. The latch mechanism 336 also includes a communication cable 348 that delivers one or more of sensor, control (e.g., actuation or deactivation), and other data signals to the electronics 322. The communication cable 348 may also receive data from the electronics 322.

Figure 26:
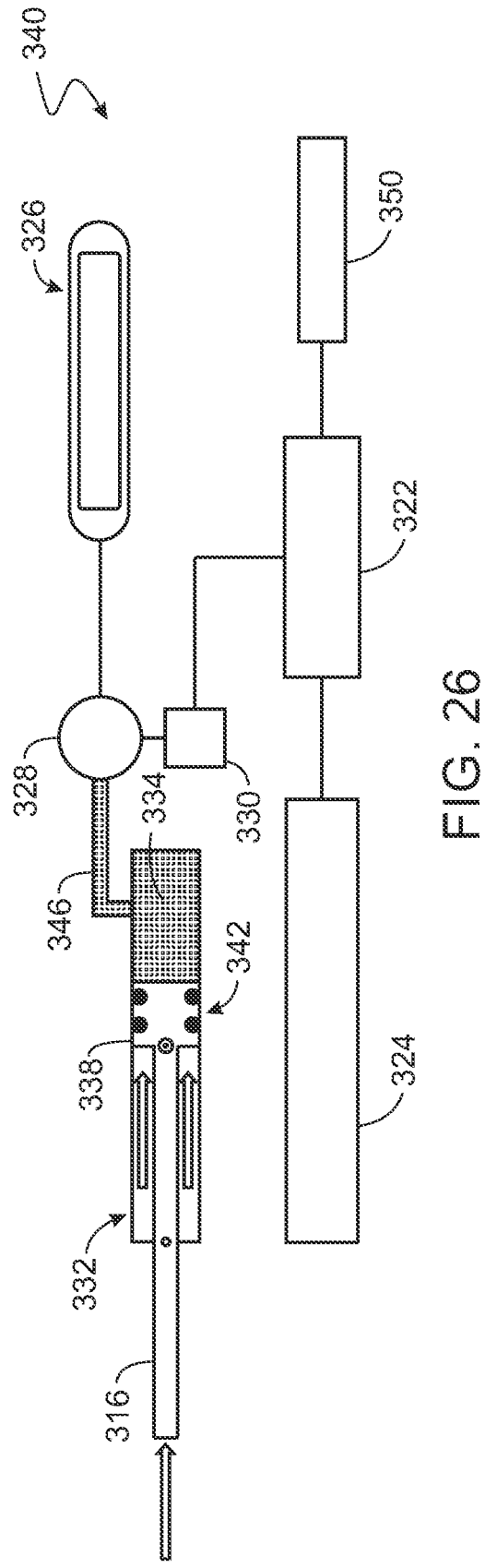
FIG. 26 is a schematic view of the actuation module of FIG. 24 in a deactivated state of the locking mechanism for which a latch of the sealing device is restrained.

Referring to FIG. 26, in a pre-operative position, wellbore hydrostatic pressure acting on a surface of the piston 342 pushes the piston 342 inward into the housing 332. The piston 342 is hydraulically locked because the valve 328 is closed. In turn, the latch pin 316 is maintained in engagement with the latch 314 such that the latch 314 is flush with the latch housing 310.

Figure 27:
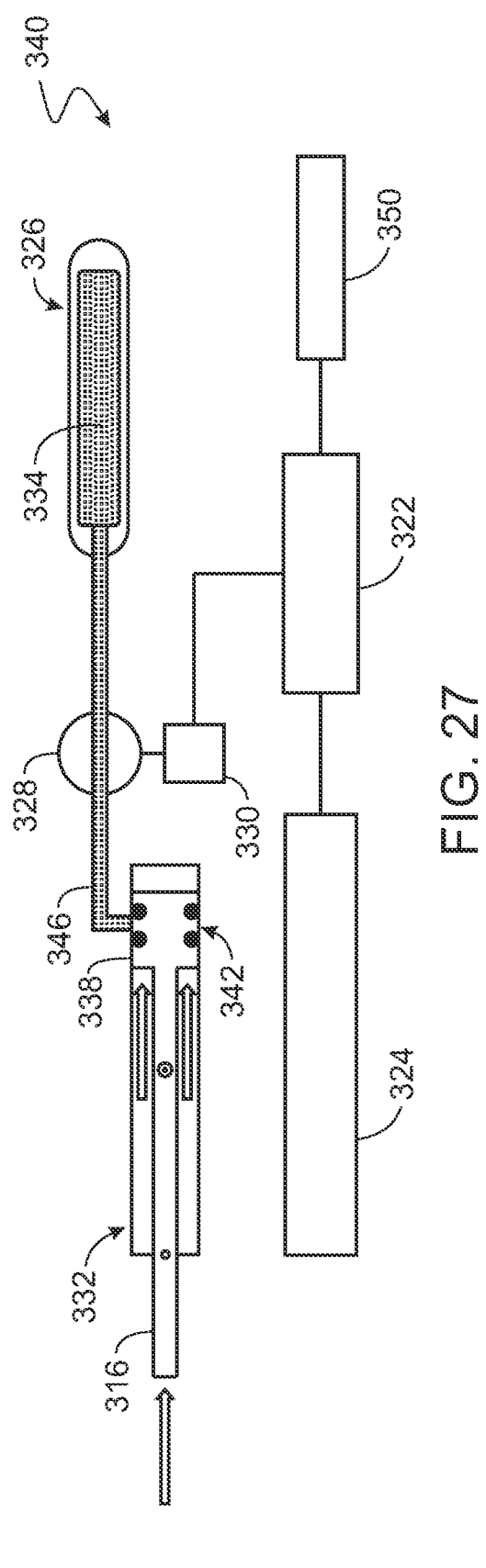
FIG. 27 is a schematic view of the actuation module of FIG. 24 in an actuated state of the locking mechanism for which a latch of the sealing device is released.

Referring to FIG. 27, when the electronics 322 receives and processes a latch actuation signal, the electronics 322 controls the valve actuator 330 to operate (e.g., open) the valve 328 to allow fluid 334 to flow out of the piston housing 332 and into the fluid tank 336. Movement of the fluid 334 to the fluid tank 326 allows the piston 338 to retract within the piston housing 332 and accordingly allows the latch pin 316 to retract within the piston housing 332 and off of the latch 314. Such movement off of the latch 314 allows the latch 314, under action of the spring 312, to move radially outward to the extended position to engage the groove 109 of the outer pipe segment 111.

Figure 25:
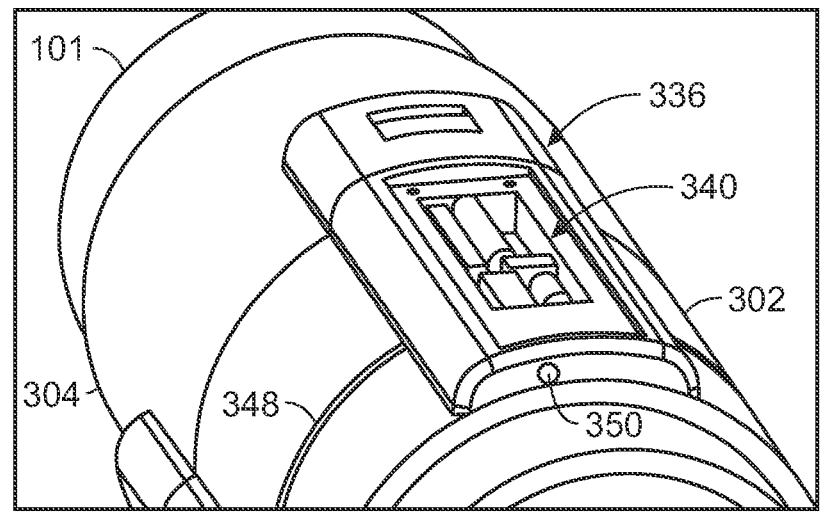
FIG. 25 is a perspective view of the inner pipe segment and the sealing device of FIG. 24, illustrating a pressor sensor along an end of the actuation module.

Referring to FIG. 25, in some embodiments, the latch mechanism 336 also includes a pressure sensor 350 that is positioned along the latch housing 310 (e.g., at an end of the housing 310 or at another location along the housing 310). The pressure sensor 350 is located to detect a fluid pressure in the annular region 103 between the inner and outer pipe segments 101, 111. A pressure signal reflecting the fluid pressure is delivered to and processed by the electronics 322. The electronics 322 can control the valve actuator to operate the valve 328 based on one or both of the pressure signal and a control signal delivered from the communication cable 348.

In some implementations, the sealing device 300 advantageously allows automatic, smart retraction (e.g., deactivation) of the latch 314 so that the sealing device 300 is able to freely move in the uphole and downhole directions 123, 125 until an operator decides on a point of no return for the sealing device 300 within a well. For example, problems sometimes arise while running an inner pipe segment within the well, which necessitates removal of the inner pipe segment before the inner pipe segment is cemented in place. If the sealing device has already passed the outer pipe segment when a problem arises, it will not be possible to retrieve the inner pipe segment without first setting the sealing device, which itself prevents its removal. Circulation of fluid within the annular region between inner and outer pipe segments would also not be possible since the sealing device will have closed off the annular region. Smart retraction of the latch 314 enables free uphole and downhole movement of the sealing device 300 until the operator decides on the point of no return.

In some embodiments, actuation of the latch 314 occurs via use of radio frequency identification (RFID) tags or other media that may be pumped into the interior channel 129 of the inner pipe segment 101 from the surface. In some embodiments, such devices may carry an encoded command that sends a control signal to the actuation module 340. Corresponding sensors (e.g., as part of the electronics 322) in the actuation module 340 are powered by the battery 324. In some embodiments, a sealing device that is otherwise substantially similar in construction and/or function to the sealing device 300 may alternatively include an actuation mechanism provided by a solenoid, a motor and gears, downlinking from the surface, or another method.

In some embodiments, downlinking from the surface involves manipulation of the fluid pressure within the annular region. For example a rig pump may be used to manipulate the pressure in an annular region to send a signal to the actuation module of a sealing device. Circulating fluid through the casing prior to cementing is typical and is performed to clean the well of any remaining cuttings and debris or to displace fluid. Pumping rates can vary during this operation. Pressure losses in the annular region are related to the flow rate, which affects the equivalent circulating density (ECD), where the ECD will be higher than the equivalent static density (ESD). Turning the pumps on and off or up and down according to a set pattern during a defined time period will cause the actuation module to experience pressure fluctuations that may be detected at a pressure sensor and interpreted as a command. In some embodiments, a sealing device includes pressure sensors (e.g., such as the pressure sensor 350), RFID sensors, or both types of sensors to allow flexibility as to the mode of actuation.

In some embodiments, the sealing device 300 may be tension-set according to the method substantially described above with respect to FIGS. 15 and 16, except that between the step of advancing the sealing device 300 and inner pipe segment 101 through the outer pipe segment 111 to an axial position at which the latch mechanism 336 is located below and spaced apart from the groove 109, and the step of performing a cement job, an activation device is dropped into the interior channel 129 of the inner pipe 101 or a pressure signal is sent to the actuation module 340 via downlinking.

The above-discussed embodiments and other embodiments are within the scope of the following claims.

EXAMPLES

In an example aspect, a sealing device includes a first ring that is fixedly attached to a pipe segment, a second ring that is movably secured to the pipe segment and spaced axially apart from the first ring in an initial configuration of the sealing device, and a third ring that axially overlaps a first wall portion of the first ring and a second wall portion of the second ring, wherein the third ring is expandable radially to accommodate a third wall portion of the first ring and a fourth wall portion of the second ring within an interior region of the third ring.

Embodiments may provide one or more of the following features.

In an example aspect combinable with any other example aspect, the third ring is made of one or more metals.

In an example aspect combinable with any other example aspect, the third ring is made entirely of metals.

In an example aspect combinable with any other example aspect, the third ring is slidable axially with respect to the first ring.

In an example aspect combinable with any other example aspect, the second ring is slidable axially with respect to the first ring in an operational configuration of the sealing device.

In an example aspect combinable with any other example aspect, the second ring is slidable axially with respect to the third ring in an operational configuration of the sealing device.

In an example aspect combinable with any other example aspect, the third ring includes multiple circumferential ribs.

In an example aspect combinable with any other example aspect, the second ring includes multiple circumferential ribs that engage the third ring and progressively increase in height along a central axis of the sealing device.

In an example aspect combinable with any other example aspect, the second ring includes a latch that is configured to engage a surrounding pipe segment.

In an example aspect combinable with any other example aspect, the latch is spring-loaded.

In an example aspect combinable with any other example aspect, the third ring overlaps the second ring by a first length in the initial configuration of the sealing device, and the third ring overlaps the second ring by a second length that is larger than the first length in a final configuration of the sealing device.

In an example aspect combinable with any other example aspect, the first, second, and third rings define a gap within the sealing device.

In an example aspect combinable with any other example aspect, the movable ring is configured to move a total axial distance of about 0.3 m to about 5 m with respect to the pipe segment during a setting operation.

In an example aspect combinable with any other example aspect, the sealing device is configured to be weight-set within a well.

In an example aspect combinable with any other example aspect, the sealing device is configured to be tension-set within a well.

In an example aspect combinable with any other example aspect, the second ring includes an automated latch mechanism that is configured to engage a surrounding pipe segment.

In an example aspect combinable with any other example aspect, the automated latch mechanism is configured to be controlled from a subterranean surface above a well in which the sealing device is installed.

In an example aspect combinable with any other example aspect, the automated latch mechanism is configured to receive and process downlink commands.

In an example aspect combinable with any other example aspect, the automated latch mechanism includes a hydraulic actuation system.

In another example aspect, a method of sealing an annular region includes moving a first pipe segment within a second pipe segment to a first downhole position, the first and second pipe segments defining the annular region therebetween. The first pipe segment carries a sealing device that includes a first ring that is fixedly attached to the first pipe segment, a second ring that is movably secured to the first pipe segment, and a third ring that axially overlaps a first wall portion of the first ring and a second wall portion of the second ring. In some embodiments, the method further includes causing cement to move along the annular region, moving the first pipe segment within the second pipe segment to a second downhole position at which a latch of the second ring is retained within a groove of the second pipe segment, and expanding the third ring radially outward to contact the second pipe segment and seal the annular region.

What is claimed is:

1. A sealing device comprising:
   a first ring that is fixedly attached to a pipe segment;
   a second ring that is movably secured to the pipe segment and spaced axially apart from the first ring in an initial configuration of the sealing device; and
   a third ring that axially overlaps a first wall portion of the first ring and a second wall portion of the second ring, wherein the third ring is expandable radially to accommodate a third wall portion of the first ring and a fourth wall portion of the second ring within an interior region of the third ring,
   wherein the second ring comprises a latch that is configured to engage a surrounding pipe segment.

2. The sealing device of claim 1, wherein the third ring is made of one or more metals.

3. The sealing device of claim 1, wherein the third ring is made entirely of metals.

4. The sealing device of claim 1, wherein the third ring is slidable axially with respect to the first ring.

5. The sealing device of claim 1, wherein the second ring is slidable axially with respect to the first ring in an operational configuration of the sealing device.

6. The sealing device of claim 1, wherein the second ring is slidable axially with respect to the third ring in an operational configuration of the sealing device.

7. The sealing device of claim 1, wherein the third ring comprises multiple circumferential ribs.

8. The sealing device of claim 1, wherein the second ring comprises multiple circumferential ribs that engage the third ring and progressively increase in height along a central axis of the sealing device.

9. The sealing device of claim 1, wherein the latch is spring-loaded.

10. The sealing device of claim 1, wherein the third ring overlaps the second ring by a first length in the initial configuration of the sealing device, and wherein the third ring overlaps the second ring by a second length that is larger than the first length in a final configuration of the sealing device.

11. The sealing device of claim 1, wherein the first, second, and third rings define a gap within the sealing device.

12. The sealing device of claim 1, wherein the movable second ring is configured to move a total axial distance of about 0.3 m to about 5 m with respect to the pipe segment during a setting operation.

13. The sealing device of claim 1, wherein the sealing device is configured to be weight-set within a well.

14. The sealing device of claim 1, wherein the sealing device is configured to be tension-set within a well.

15. The sealing device of claim 1, wherein the second ring comprises an automated latch mechanism that is configured to engage a surrounding pipe segment.

16. The sealing device of claim 15, wherein the automated latch mechanism is configured to be controlled from a subterranean surface above a well in which the sealing device is installed.

17. The sealing device of claim 15, wherein the automated latch mechanism is configured to receive and process down-link commands.

18. The sealing device of claim 15, wherein the automated latch mechanism comprises a hydraulic actuation system.

19. A method of a sealing an annular region, the method comprising:

moving a first pipe segment within a second pipe segment to a first downhole position, the first and second pipe segments defining the annular region therebetween, and the first pipe segment carrying a sealing device that comprises:

a first ring that is fixedly attached to the first pipe segment, a second ring that is movably secured to the first pipe segment, and a third ring that axially overlaps a first wall portion of the first ring and a second wall portion of the second ring;

causing cement to move along the annular region;

moving the first pipe segment within the second pipe segment to a second downhole position at which a latch of the second ring is retained within a groove of the second pipe segment; and expanding the third ring radially outward to contact the second pipe segment and seal the annular region.

20. A sealing device comprising:

a first ring that is fixedly attached to a pipe segment;

a second ring that is movably secured to the pipe segment and spaced axially apart from the first ring in an initial configuration of the sealing device; and a third ring that axially overlaps a first wall portion of the first ring and a second wall portion of the second ring, wherein the third ring is expandable radially to accommodate a third wall portion of the first ring and a fourth wall portion of the second ring within an interior region of the third ring, wherein the second ring comprises multiple circumferential ribs that engage the third ring and progressively increase in height along a central axis of the sealing device.

* * * * *